Feb. 15, 1938.  L. B. HOFFMANN  2,108,337
FILM DRIVING MEANS
Filed Nov. 2, 1936   3 Sheets-Sheet 1

Inventor:
Louis B. Hoffmann.
Attorney.

Inventor:
Louis B. Hoffmann.

Attorney.

Patented Feb. 15, 1938

2,108,337

UNITED STATES PATENT OFFICE 2,108,337

FILM DRIVING MEANS

Louis B. Hoffmann, Hollywood, Calif., assignor to Mitchell Camera Corporation, West Hollywood, Calif., a corporation of Delaware Application November 2, 1936, Serial No. 108,780

8 Claims. (Cl. 271—2.3)

This invention relates generally to sound picture recording and reproducing apparatus, and more particularly to means for driving a film at constant speed for sound wave translation in sound picture recording or projection apparatus.

As is well known, it is essential in recording or reproducing sound on or from a sound film that the film may be moved past the recording or reproducing light beam with a high degree of steadiness or uniformity of motion, as slight variations or fluctuations in sound record speed are reflected in the reproduced sound either as very noticeable and highly objectionable pitch variations, as a higher frequency "flutter", or as simple roughness, depending upon the frequency of the speed fluctuations that occur.

It is a primary object of the present invention to provide improved means for moving the sound record film past the sound wave translation point with a high degree of uniformity of speed, both in recording and reproduction of sound.

While the present invention is applicable either to recording or reproduction of sound, it is particularly applicable and useful in its adaptation to recording apparatus, and will therefore be referred to particularly in that connection, though without necessary implied limitation to such use.

In accordance with the present invention, the film strip coming from the feed reel engages first one side of a driven sprocket, from there passes over a yieldingly mounted tensioning roller, and then goes to a smooth faced rotatable drum which is provided with an inertia mass sufficient to insure steadiness of motion. Leaving this drum, which is driven by the moving film strip, the film passes over a second yieldingly mounted tensioning roller and then goes to a driving sprocket which is driven through a mechanical filter from the same source of power that drives the first mentioned sprocket. This second sprocket is also provided with an inertia mass, so that speed fluctuations in the drive mechanism are absorbed in the mechanical filter and are not transmitted to the sprocket. From this second sprocket the film goes to the other side of the first mentioned sprocket, and from there is taken to the take-up reel. The first sprocket thus acts as a driven hold-back member, and the second sprocket, which is driven with substantially perfect uniformity of motion owing to the filter and fly wheel, pulls the film around the smooth faced inertia mass drum, causing said drum to rotate. The two yieldingly mounted tensioning rollers between the two sprockets and the drum maintain a constant tension on the film, and the roller between the first sprocket and the drum prevents speed fluctuations of said sprocket from being transmitted to the drum. The second sprocket being steadied by the fly wheel and filter combination, is not subject to speed fluctuations, but any jerkiness arising from sprocket tooth action is absorbed by the second tensioning roller.

Various additional objects and features of the invention will appear in the following detailed description of a present preferred embodiment thereof, reference for this purpose being had to the accompanying drawings, in which.

Figure 1:
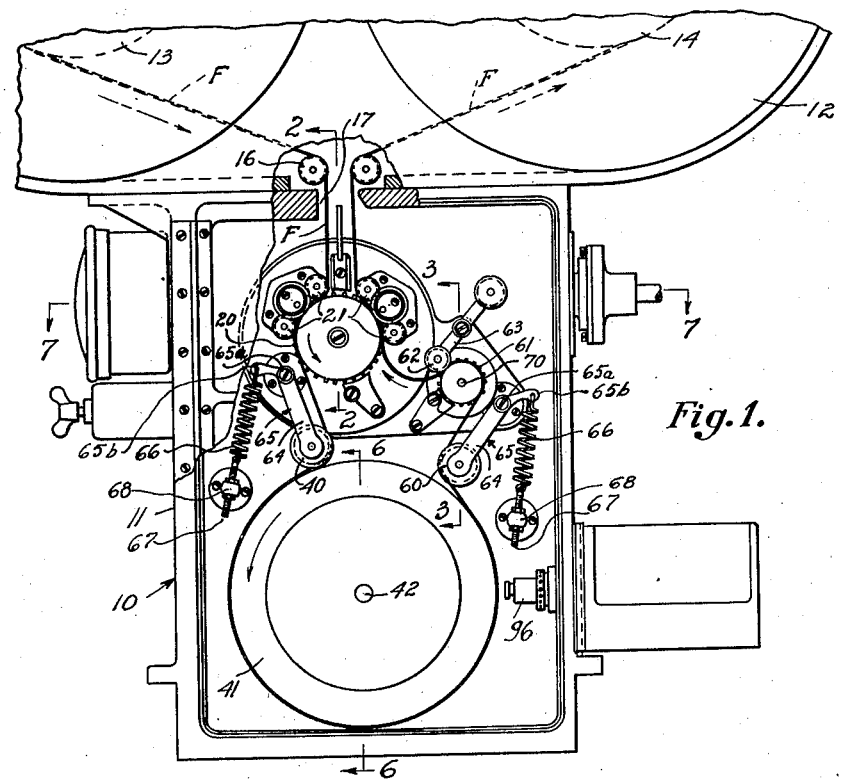
Fig. 1 is a view showing a sound recording unit in accordance with the present invention.

The recording apparatus is generally indicated in the drawings at 10, and is shown provided with a casing 11 supporting magazine 12 containing the feed and take-up film rolls 13 and 14, respectively. The film and take-up rolls are mounted on reels, not shown, the take-up reel being provided with any suitable or well known take-up drive means, not necessary here to illustrate.

The film strip F coming from feed roll 13 passes downwardly from magazine 12 over idler roller 16, entering recorder case 11 through aperture 17 and passing downwardly to engage one side of a film sprocket 20. The film strip eventually engages the opposite side of this same sprocket 20 and then passes upwardly through aperture 17 to take-up reel 14. The film is held in engagement with sprocket 20 by retaining rolls 21 of any conventional type.

Figure 2:
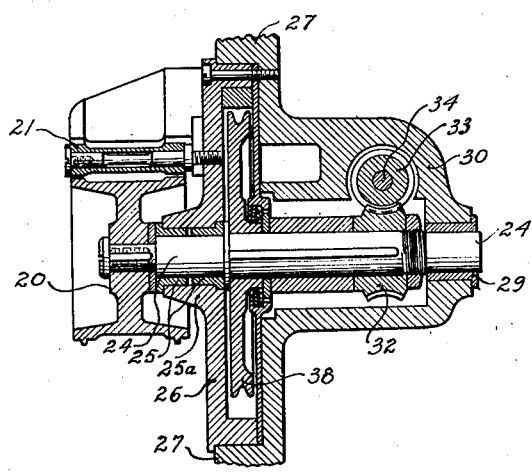
Fig. 2 is a vertical section taken on line 2—2 of Fig. 1.
Figure 3:
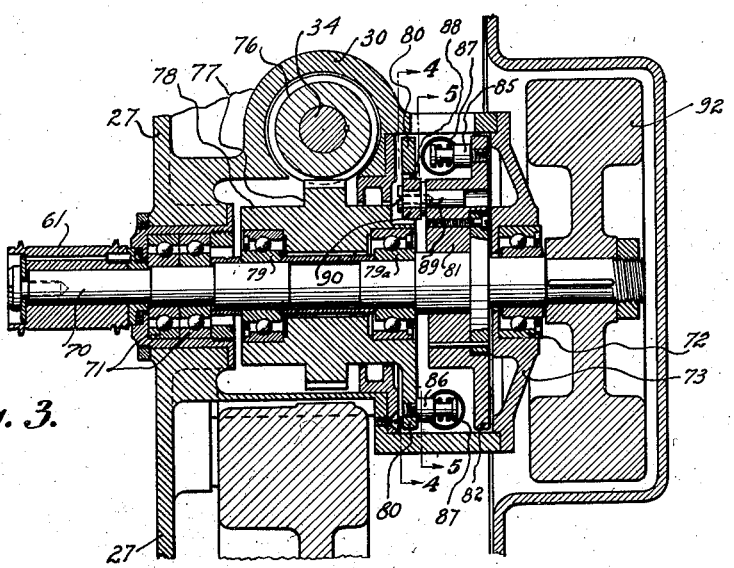
Fig. 3 is a vertical section taken on line 3—3 of Fig. 1.
Figure 4:
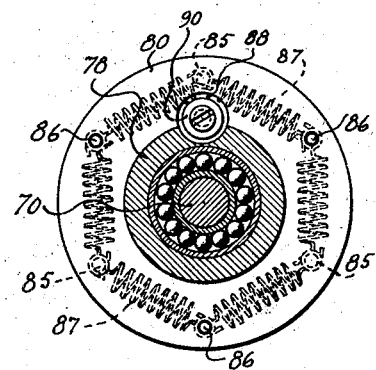
Fig. 4 is a vertical section taken on line 4—4 of Fig. 3, the housing wall being omitted.
Figure 7:
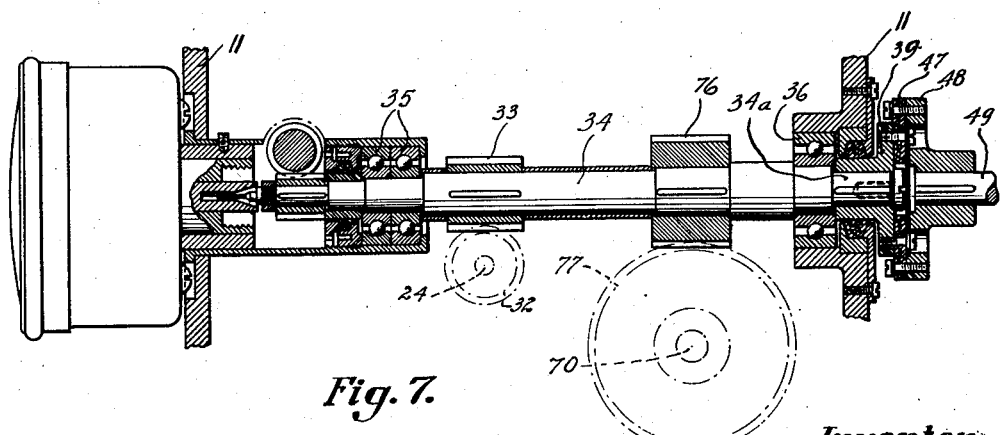
Fig. 7 is a horizontal section taken on line 7—7 of Fig. 1.

As shown best in Fig. 2, sprocket 20 is rigidly mounted on the outer end of a shaft 24 which is journalled in bearings 25 carried by a tubular boss 25a on a plate 26 mounted on casing wall 27. The opposite end of shaft 24 is journalled in a bearing 29 carried by a gear housing 30 formed integrally with wall 27, and non-rotatably mounted on shaft 24 within said housing 30 is a worm wheel 32 driven by a worm 33 on a horizontal main drive shaft 34 extending through housing 30 and journalled at its ends in suitable bearings at 35 and 36 supported in any suitable manner by the sides of the exterior casing (see Fig. 7). Shaft 24 is here illustrated as also carrying a belt pulley 38, which may be understood as driving a belt which operates the take-up reel. Since the driving connection between pulley 38 and the take-up reel forms no part of the present invention, no showing thereof is made in the drawings.

Shaft 34 has a portion 34a extending outside the casing, and mounted thereon is a coupling member 39 connected through flexible ring 47 to a coupling member 48 on a drive shaft 49, which will be understood to be driven by any suitable motor not shown.

From film sprocket 20, the film strip passes over a tensioning roller 40 and then goes to a smooth film drum 41, preferably of comparatively large diameter, as substantially six inches in diameter. This drum 41 is non-rotatably mounted on a shaft 42 journalled in bearings 43 supported by wall 27. This drum 41 is mounted below sprocket 20, and its axis is somewhat off-set to the right from the axis of drum 20, as seen in Fig. 1. It has been stated that drum 41 is a smooth surfaced film drum; by this is meant that the drum is not provided with sprocket teeth. The peripheral film engaging surface 41a of the drum is, however, recessed at 45 and 46 directly opposite the perforations of the film strip passing over it. This is of advantage in that, any rough or bent edges of the perforations are thereby prevented from engaging the drum and influencing its steadiness of rotation. Recess 46 is preferably of the combined width of the perforations and sound track, and is painted black to reduce reflection of light.

Inside of bearing 43 shaft 42 is provided with an inertia mass or fly wheel 50, here shown as provided with an adjustable counter balance 51, and beyond fly wheel 50 the shaft is supported in bearings 53 carried by a supporting bracket 54.

From drum 41 the film strip next passes over a tensioning roller 60 and then goes to a film sprocket 61, which as here shown is located above drum 41 and to one side of and somewhat lower than the first mentioned sprocket 20. The film strip is retained on sprocket 61 by any conventional means, as by retaining roll 62 mounted on pivoted arm 63. From sprocket 61 the film goes to sprocket 20, a slack loop being formed between the two sprockets, as indicated, and sprocket 20 feeds the film toward the take-up reel, as previously described. As appears from Fig. 1, tensioning rollers 40 and 60 are so positioned that the film strip engages substantially three-quarters of the peripheral surface of drum 41. These rollers, pressing inwardly between sprockets 20 and 61 on the one hand and drum 41 on the other, tension the film and wrap it in driving engagement about drum 41. As here shown, each of rollers 40 and 60 is mounted on a swinging arm 64 of a bell crank 65 pivoted at 65a, and is pressed against the film by a spring 66 connected between bell crank arm 65b and a pin 67 screwthreaded within a post 68 mounted on casing wall 27. The tension of the film strip from sprocket 20 around drum 41 to sprocket 61 is adjustable by screwing adjustment pins 67 back and forth in posts 68.

Sprocket 61 is mounted on the outer end of a shaft 70 which is journalled at one end in bearings 71 supported by wall 27, and near its opposite end by a bearing 72 carried by a plate 73 secured to the previously mentioned housing 30.

Main drive shaft 34 has a gear 76 meshing with a gear 77 formed on an annular member 78 surrounding shaft 70 and relatively rotatable thereon, bearings 79 and 79a being provided between member 78 and shaft 70.

On the inner end of this member 78 there is formed an outwardly extending flange 80, and rigidly mounted on shaft 70 just rearwardly of flange 80 is an annular member 81 provided with an outwardly annular flange 82 of the same diameter as flange 80.

Figure 5:
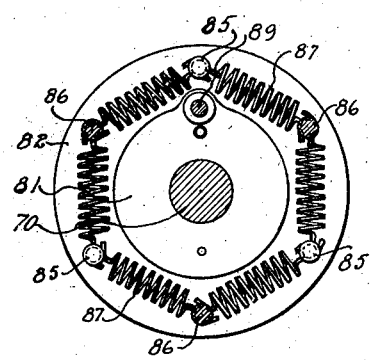
Fig. 5 is a vertical section taken on line 5—5 of Fig. 3, the housing wall being omitted.
Figure 6:
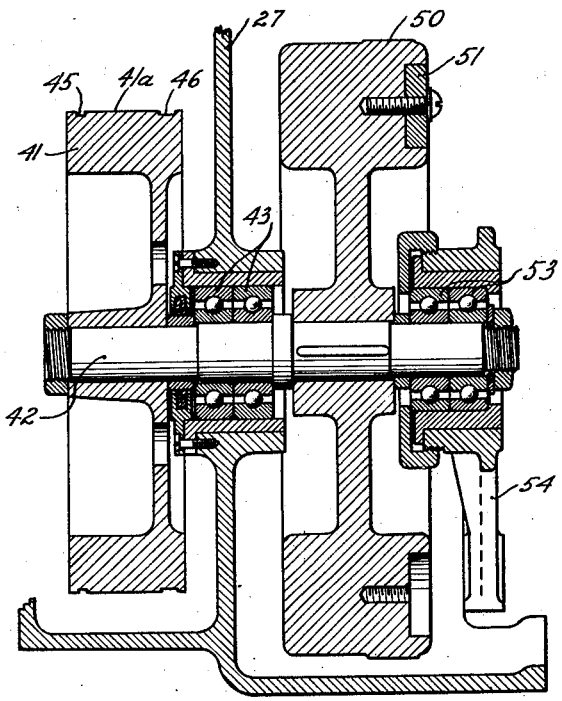
Fig. 6 is a vertical section taken on line 6—6 of Fig. 1.

Mounted on flange 82 and extending towards flange 80 are three studs 85, spaced 120° apart, and mounted on flange 80 and extending towards flange 82 are three similar studs 86 spaced 120° apart. Studs 85 and 86 are interconnected by tension springs 87, as indicated in Fig. 5, studs 85 and 86 thus being spaced apart normally by 60°. Flange 80 is provided with an arcuate slot 88 which receives the projecting end of a stud 89 mounted on member 81, the end of said stud as here shown being provided with a bushing 90.

The extreme rearward end of shaft 70 is provided with an inertia mass or fly wheel 92, which functions to steady the rotation of shaft 70 and sprocket 61.

Main drive shaft 34 rotates gear 76 to drive gear 77 and member 78, and the rotation of member 78 is transmitted to sprocket shaft 70 through filter springs 87. The mechanical filter constituted by discs 80 and 82 and interconnecting springs 87 absorbs speed irregularities or gear vibrations of the driving mechanism back of the filter, the inertia mass provided by fly wheel 92 preventing such speed irregularities from being transmitted through the filter to shaft 70. Shaft 70 and sprocket 61 therefore rotate with a high degree of uniformity of speed.

In starting, power is transmitted through the mechanical filter by engagement of the end of arcuate slot 88 with stud 89. When the recorder is up to speed, stud 89 rides at a midway position between the ends of the slot, and there is no interconnection between discs 80 and 82 other than that afforded by springs 87.

An optical recording unit is indicated at 96, and is positioned to direct the recording light beam against the film while supported on the face of drum 41, said beam being of course directed to impinge on the sound track area of the film, which as previously described comes over drum surface recess 46. The optical recording unit may involve an optical system of any well known or approved type, and need not here be described in detail.

The operation of the film driving mechanism is as follows: Main drive shaft 34 is driven by a suitable driving motor, not shown. This shaft drives sprocket 20 through gears 33 and 32 and shaft 24, and also drives sprocket 61 through gears 76 and 77 and the mechanical filter constituted by springs 87, the shaft 70 on which sprocket 61 is mounted and which is driven from shaft 34 through said filter carrying an inertia mass in the form of fly wheel 92. Sprocket 61 is therefore driven at steady, uniform speed, speed irregularities due to back lash in gears, etc., being filtered out and prevented from transmission to said sprocket by means of the described mechanical filter and fly wheel.

The film strip coming from the feed reel of the magazine first engages one side of sprocket 20, then passes over tensioning roller 40 to engage and pass around drum 41, and from there goes around tensioning roller 60 to constant speed sprocket 61, after which the film forms a slack loop and then engages the opposite side of sprocket 20 to be fed upwardly to the take-up reel in the magazine. The film strip between the two sprockets is tensioned by rollers 40 and 60, one acting between sprockets 20 and drum 41, and the other acting between drum 41 and sprocket 61. This tension is made sufficient to cause drum 41 to be driven by the film strip. Owing to the large inertia mass 50 turning with this drum, the drum rotates with a high degree of uniformity.

It will be evident that there is substantially a constant length of film between constant speed sprocket 61 and driven sprocket 20. Sprocket 20 serves as a driven hold-back member, while the film is constantly and steadily advanced by second sprocket 61. Slight irregularities in the speed of the film moving toward drum 40 due to sprocket tooth action in passing over sprocket 20, or to back lash, etc., in the driving interconnections back of sprocket 20, are absorbed by yieldingly mounted tension roller 40. Any slight irregularity in the speed of the film owing to sprocket tooth action in passing over second sprocket 61 is absorbed by yieldingly mounted tension roller 60. The two yieldingly mounted tension rollers thus maintain a constant tension in the film strip passing around drum 41, and at the same time serve to absorb any final speed irregularities owing to sprocket tooth action in passing over the two sprockets or to the gear drive back of sprocket 20. The inertia mass turning with drum 41 finally assures perfectly constant speed of the film strip passing thereover in line with the optical recording unit.

It has been stated that film driven drum 41 is preferably of comparatively large diameter, as for instance of a diameter of the order of six inches. This provision is to minimize the noticeability of any pitch variations arising from slight unavoidable eccentricity of the drum on its axis of rotation. The drum being driven by the film strip, which in standard motion picture practice travels at one and one half feet per second, the periphery of the drum travels at that same speed. The diameter of the drum is then preferably made sufficiently large in relation to this fixed peripheral speed that it will turn over no more than approximately once per second, so that the frequency of any pitch variation due to drum eccentricity will not substantially exceed one per second, which is not considered to be objectionable for the small degree of speed variation occasioned by eccentricity in a precision manufactured drum. It will be evident that a drum of substantially six inches in diameter or slightly less, will give the relations desired when the film travels at one and one half feet per second. For slower film speeds, used with narrow gauge film, the drum may of course be of correspondingly decreased diameter while still holding speed variations of the type here being considered to a frequency of no higher than substantially one per second.

I have now illustrated and described one preferred specific embodiment of my invention; it is to be understood, however, that various changes in design, structure and arrangement may be made without departing from the spirit and scope of the invention or of the appended claims.

I claim:

1. Film driving means comprising two film drive sprockets adapted to engage spaced points of a film strip, said film strip forming a film loop between said sprockets, drive means for said sprockets, driving interconnections between said drive means and said sprockets, a mechanical vibration filter in the driving interconnection between said drive means and the second sprocket engaged by the film strip, a film driven drum drivingly engaged by the film loop between the two sprockets, an inertia mass rigidly associated with the second sprocket, and another inertia mass rigidly associated with the film driven drum.

2. Film driving means comprising two film drive sprockets adapted to engage spaced points of a film strip, said film strip forming a film loop between said sprockets, drive means for said sprockets, driving interconnections between said drive means and said sprockets, a mechanical vibration filter in the driving interconnection between said drive means and the second sprocket engaged by the film, a film driven drum drivingly engaged by the film loop between the two sprockets, yieldable film tensioning means for tensioning the film loop between the two sprockets, an inertia mass rigidly associated with the second sprocket, and another inertia mass rigidly associated with the film driven drum.

3. Film driving means comprising two film drive sprockets adapted to engage spaced points of a film strip, said film strip forming a film loop between said sprockets, drive means for said sprockets, driving interconnections between said drive means and said sprockets, a mechanical vibration filter in the driving interconnection between said drive means and the second sprocket engaged by the film, a film driven drum drivingly engaged by the film loop between the two sprockets, an inertia mass rigidly associated with the second sprocket, another inertia mass rigidly associated with the film driven drum, and a yieldingly mounted tensioning roller engaging the film strip between the first sprocket and the film drum acting to prevent speed fluctuations of the first sprocket from being transmitted to the film drum.

4. Film driving means comprising two film drive sprockets adapted to engage spaced points of a film strip, said film strip forming a film loop between said sprockets, drive means for said sprockets, driving interconnections between said drive means and said sprockets, a mechanical vibration filter in the driving interconnection between said drive means and the second sprocket engaged by the film, a film driven drum drivingly engaged by the film loop between the two sprockets, an inertia mass rigidly associated with the second sprocket, another inertia mass rigidly associated with the film driven drum, and a yieldingly mounted tensioning roller engaging the film strip between the film drum and the second sprocket acting to prevent speed fluctuations owing to sprocket tooth action from being transmitted to said drum.

5. Film driving means comprising two film drive sprockets adapted to engage spaced points of a film strip, said film strip forming a film loop between said sprockets, drive means for said sprockets, driving interconnections between said drive means and said sprockets, a mechanical vibration filter in the driving interconnection between said drive means and the second sprocket engaged by the film, a film driven drum drivingly engaged by the film loop between the two sprockets, an inertia mass rigidly associated with the second sprocket, another inertia mass rigidly associated with the film driven drum, a yieldingly mounted tensioning roller engaging the film strip between the first sprocket and the film drum acting to prevent speed fluctuations of the first sprocket from being transmitted to the film drum, and a yieldingly mounted tensioning roller engaging the film strip between the film drum and the second sprocket acting to prevent speed fluctuations owing to sprocket tooth action from being transmitted to said drum.

6. Film driving means comprising two film drive sprockets adapted to engage spaced points of a film strip, said film strip forming a film loop between said sprockets, drive means for said sprockets, driving interconnections between said drive means and said sprockets, a mechanical vibration filter in the driving interconnection between said drive means and the second sprocket engaged by the film, a comparatively large film driven drum drivingly engaged by the film loop between the two sprockets, an inertia mass rigidly associated with the second sprocket, another inertia mass rigidly associated with the film driven drum, a yieldingly mounted tensioning roller engaging the film strip between the first sprocket and the film drum acting to prevent speed fluctuations of the first sprocket from being transmitted to the film drum, and a yieldingly mounted tensioning roller engaging the film strip between the film drum and the second sprocket acting to prevent speed fluctuations owing to sprocket tooth action from being transmitted to said drum.

7. Film driving means comprising two film drive sprockets adapted to engage spaced points of a film strip, said film strip forming a film loop between said sprockets, drive means for said sprockets, driving interconnections between said drive means and said sprockets, a mechanical vibration filter in the driving interconnection between said drive means and the second sprocket engaged by the film, a comparatively large film driven drum adapted to be drivingly engaged by said film loop, film guide and tensioning means for wrapping said film loop about substantially three quarters of the periphery of said drum, an inertia mass rigidly associated with the second sprocket, and another inertia mass rigidly associated with the film driven drum.

8. Film driving means comprising two film drive sprockets adapted to engage spaced points of a film strip, said film strip forming a film loop between said sprockets, drive means for said sprockets, driving interconnections between said drive means and said sprockets, a mechanical vibration filter in the driving interconnection between said drive means and the second sprocket engaged by the film, a comparatively large film driven drum adapted to be drivingly engaged by said film loop, a pair of yieldingly mounted film tensioning rollers located outside the film loop and adapted to engage the film loop just ahead of and just beyond the points at which it engages and leaves the drum, said film rollers acting to tighten the film loop about the film drum and also to prevent speed fluctuations of the first sprocket and speed fluctuations owing to sprocket tooth action at the second sprocket from affecting the drum, an inertia mass rigidly associated with the second sprocket, and another inertia mass rigidly associated with the film driven drum.

LOUIS B. HOFFMANN.